(12) United States Patent
Bausch et al.

(10) Patent No.: US 6,289,961 B1
(45) Date of Patent: Sep. 18, 2001

(54) APPARATUS FOR LONGITUDINALLY WELDING AND SEVERING A THERMOPLASTIC PACKAGING HOSE

(75) Inventors: Günther Bausch, Immendingen; Alfred Wipf, Jestetten, both of (DE)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/500,042

(22) Filed: Feb. 8, 2000

(30) Foreign Application Priority Data

Feb. 8, 1999 (CH) .................................................. 0234/99

(51) Int. Cl.[7] ...................................................... B32B 31/00
(52) U.S. Cl. ......................... 156/498; 156/515; 156/530; 156/553; 156/555; 156/582; 156/583.4
(58) Field of Search ................................ 156/73.1, 73.3, 156/251, 498, 515, 530, 553, 555, 580, 582, 583.1, 583.4

(56) References Cited

U.S. PATENT DOCUMENTS

| | | | |
|---|---|---|---|
| 5,230,761 | * 7/1993 | Crawford | 156/73.3 |
| 5,632,831 | * 5/1997 | Stull | 156/73.3 |
| 5,932,041 | * 8/1999 | Dolling et al. | 156/73.3 |

FOREIGN PATENT DOCUMENTS

| | | |
|---|---|---|
| 527 090 | 10/1972 | (CH) . |
| 27 27 960 | 1/1979 | (DE) . |

* cited by examiner

Primary Examiner—James Sells
(74) Attorney, Agent, or Firm—Venable; Gabor J. Kelemen

(57) ABSTRACT

An apparatus for longitudinally welding and severing superposed thermoplastic films forming a packaging hose includes first and second feed rollers each having an outer periphery contacting one another for advancing the films passing therebetween; a drive for rotating at least one of the feed rollers; a circular heating disk mounted in the first feed roller coaxially therewith and having an outer diameter greater than the peripheral diameter of the first feed roller; and a circumferential groove provided in the second feed roller in alignment with the heating disk. Peripheral portions of the heating disk project into the circumferential groove of the second feed roller.

11 Claims, 3 Drawing Sheets

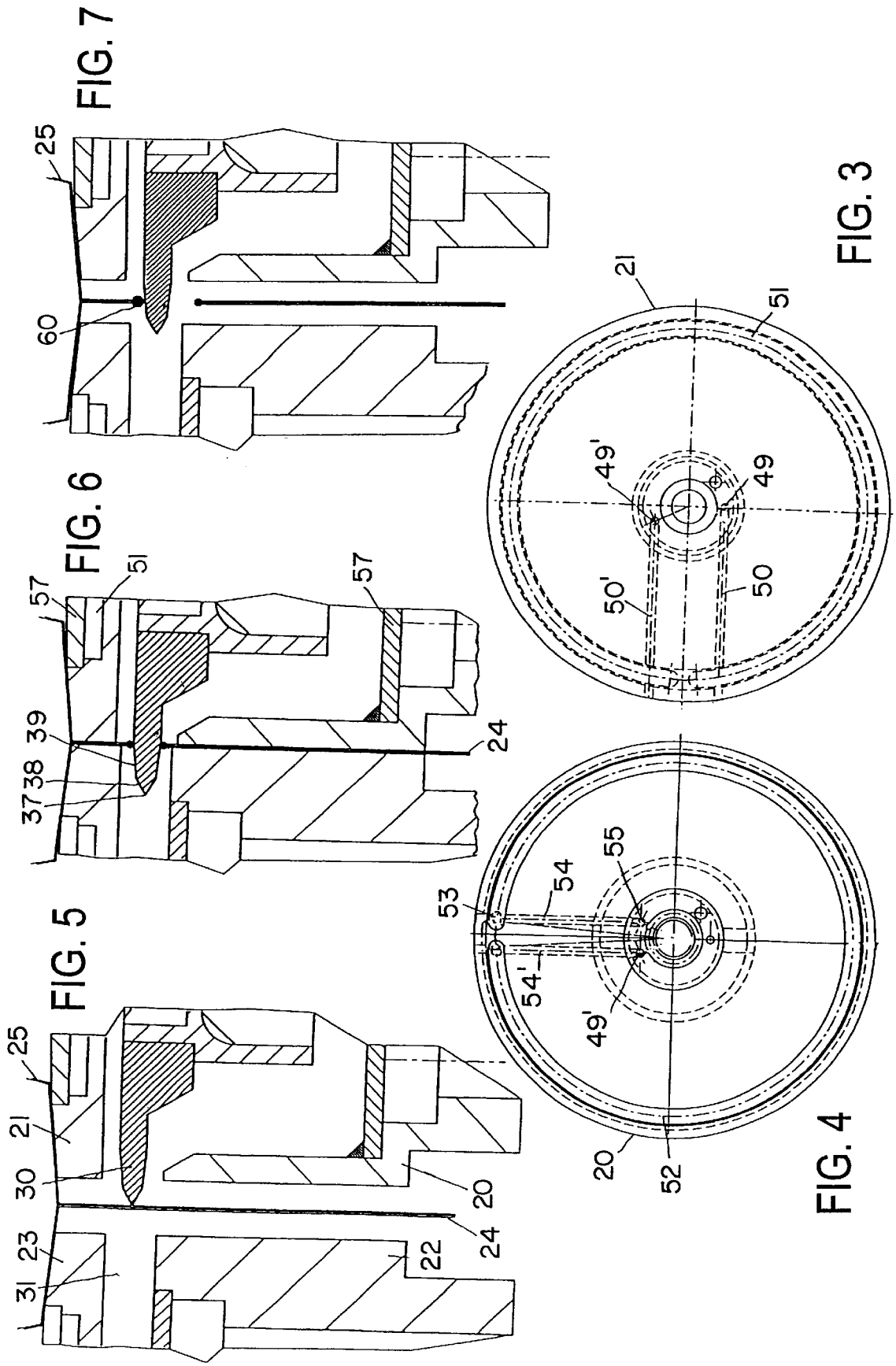

APPARATUS FOR LONGITUDINALLY WELDING AND SEVERING A THERMOPLASTIC PACKAGING HOSE

CROSS REFERENCE TO RELATED APPLICATION

This application claims the priority of Swiss Application No. 1999 0234/99 filed Feb. 8, 1999, which is incorporated herein by reference.

BACKGROUND OF THE INVENTION

This invention relates to an apparatus for longitudinally sealing and severing a packaging hose made of a thermoplastic film. The apparatus is intended for use particularly in packing machines.

Swiss Patent No. 527,090 discloses a sealing and severing apparatus for a packing machine. The thermoplastic film hose is obtained by folding it by a hose forming (hose folding) box about two columns of products and subsequently the two superposed films of the packing hose are sealed together lengthwise between the two product columns. Downstream of the cooperating advancing and sealing rollers the thus-formed two parallel hoses are severed from one another by means of a rotating circular knife which cooperates with a circular elastomer counter support.

German Offenlegungsschrift (application published without examination) No. 2,727,960 discloses another sealing and severing apparatus which has a heated circular severing knife. A plate, serving as a counter support, is provided with a longitudinal groove into which the knife projects. Additional advancing components are needed for conveying the film.

SUMMARY OF THE INVENTION

It is an object of the invention to provide an improved sealing and severing apparatus which ensures a rapid sealing and severing of a high-quality welded seam.

This object and others to become apparent as the specification progresses, are accomplished by the invention, according to which, briefly stated, the apparatus for longitudinally welding and severing superposed thermoplastic films forming a packaging hose includes first and second feed rollers each having an outer periphery contacting one another for advancing the films passing therebetween; a drive for rotating at least one of the feed rollers; a circular heating disk mounted in the first feed roller coaxially therewith and having an outer diameter greater than the peripheral diameter of the first feed roller; and a circumferential groove provided in the second feed roller in alignment with the heating disk. Peripheral portions of the heating disk project into the circumferential groove of the second feed roller.

BRIEF DESCRIPTION OF THE DRAWINGS

FIGS. 3 and 4 are end views of two components of the preferred embodiment.

FIGS. 5, 6 and 7 are fragmentary sectional views of part of the preferred embodiment.

DESCRIPTION OF THE PREFERRED EMBODIMENT

Figure 1:
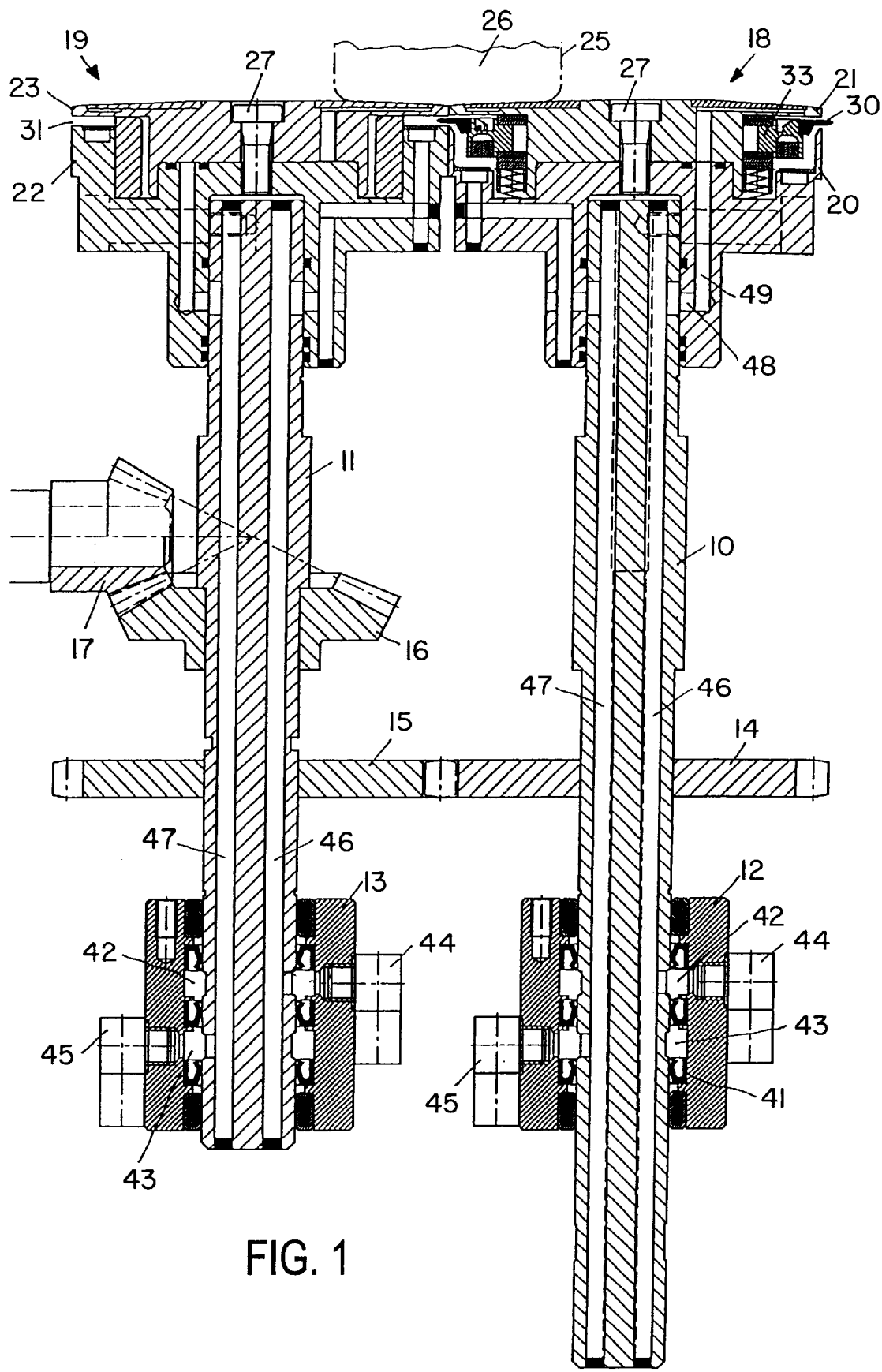
FIG. 1 is an axial sectional view of a welding and severing apparatus according to a preferred embodiment of the invention.
Figure 2:
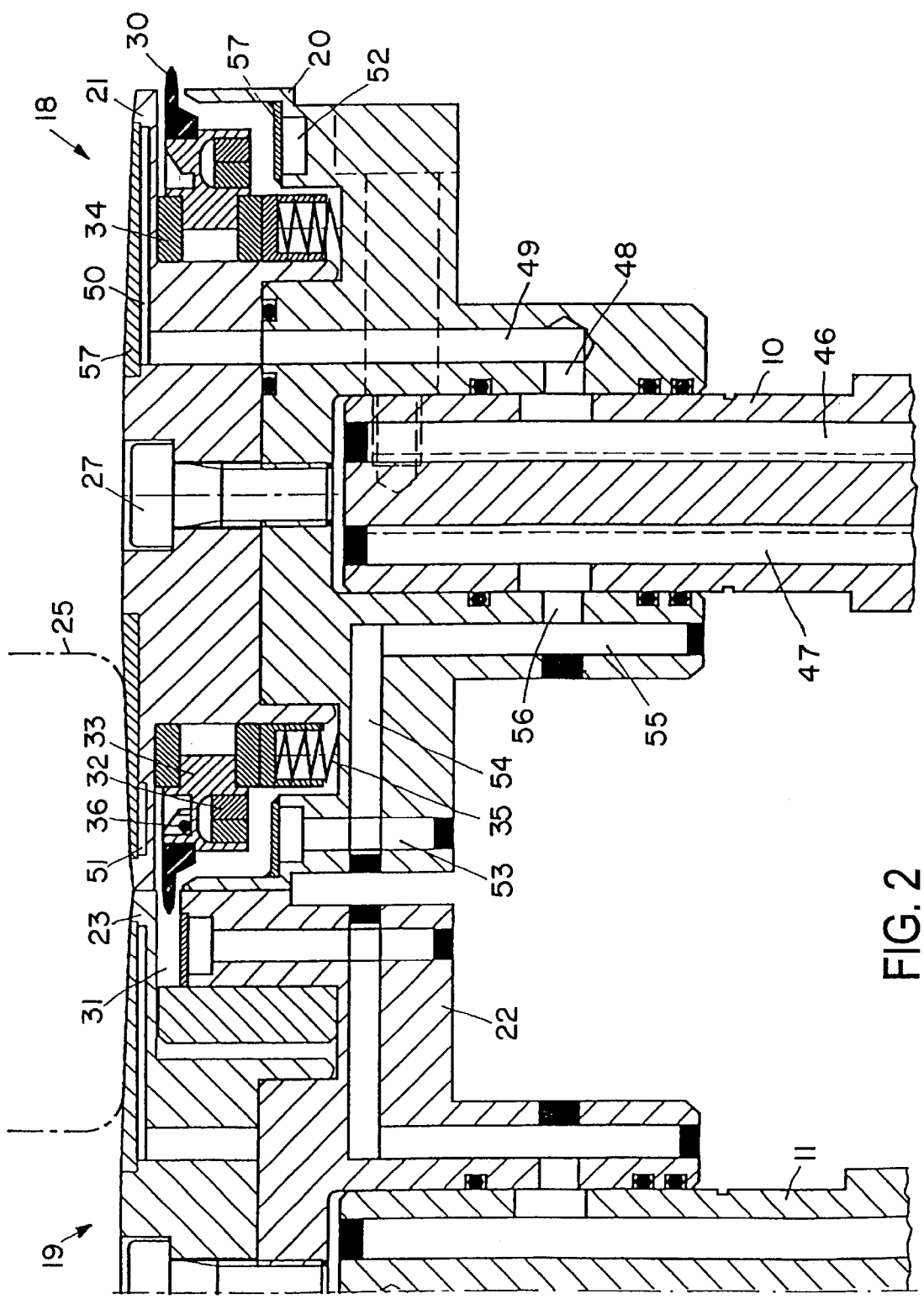
FIG. 2 is an enlarged axial sectional detail of the structure shown in FIG. 1.

Turning to FIGS. 1 and 2, two axially parallel shafts 10 and 11 are rotatably supported in respective bearings 12 and 13 and are coupled to one another by spur gears 14 and 15 to cause rotation of the shafts in opposite directions. The shaft 11 is coupled by a bevel gear drive 16, 17 with a non-illustrated drive motor. The shafts 10 and 11 each carry a respective feed roller 18, 19 each including two individual rollers 20, 21 and, respectively, 22, 23 which are axially spaced from one another along their circumference. The rollers 20–23 have identical external diameters. The rollers 20, 22 and 22, 23 contact one another with the interposition of two film sheets 24 (FIG. 5) of a film hose 25 which is to be sealed (welded) together and which contains products 26 to be packaged in uniform distances from one another. The rollers 20, 21 and 22, 23 are secured to one another by a respective central screw 27.

A heating disk 30 is mounted between the rollers 20, 21. The heating disk 30, whose outer diameter is greater than that of the rollers 20, 21 extends into a circumferential groove 31 defined between the rollers 22, 23. The heating disk 30 is disposed on a metal ring 33 which is heated by heating wires 32 and which is thermally insulated from the rollers 20, 21 by insulating disks 34. The ring 33 is pressed against the upper insulating disk 34 by springs 35 which compensate for the heat expansion of the ring 33. The temperature of the heating disk 30 is measured by a temperature sensor 36 for regulating the heat output of the heating wires 32. The distance of the underside of the roller 21 at the periphery and the distance of the upper side of the roller 20 from the radial plane containing the circular cutting edge 37 of the heating disk 30 is significantly (preferably at least five times) larger than twice the thickness of the film 24 to be welded together. As shown in FIGS. 5, 6 and 7, the cutting edge 37 is formed by two frustoconical surfaces 38 which are symmetrical to a radial plane and each having a cone angle of approximately 120°. The surfaces 38 are adjoined radially inwardly by respective second frustoconical surfaces 39 which have a significantly larger cone angle of approximately 158°.

At least the individual rollers 21, 23 contacting the hose 25 (or all the rollers 20–23 as shown) are cooled by a coolant, such as water. For this purpose the bearings 12, 13 also serve as coolant couplings and have two circumferential grooves 42, 43 which are sealed from one another and outwardly by sealing rings 41 and thus function as coolant channels. A coupling nipple 44 opens into the groove 42 for supplying cooling water from a coolant source, whereas a coupling nipple 45 opens into the groove 43 for removing the cooling water. The grooves 42, 43 communicate with axial bores 46, 47 provided in the shafts 10, 11. The bore 46 of the shaft 10 is connected by a radial bore 48 and an axially parallel bore 49 in the rollers 20, 21 with a radial channel 50 which opens into one end of a circumferential groove 51 extending almost 360°. The other end of the groove 51 merges into a radial channel 50' which is connected by axial and radial bores 49', 54', provided in the rollers 20, 21, with one end of a further circumferential groove 52 provided in the roller 20. The other end of the groove 52 is coupled with the bore 47 by means of radial and axial bores 53, 54, 55 and 56. The grooves 51, 52 and the radial channels 50, 50' are covered by welded-on lids 57. Thus, the cooling water flows first through the groove 51 along the periphery of the roller 21 oriented towards the hose 25 and then flows along the periphery of the other roller 20. The cooling of the feed roller 19 occurs in the same manner.

The described apparatus is particularly adapted for sealing and severing hoses 25 of monofilms, particularly PE films as well as Coex films of LDPE/HDPE.

FIGS. 5, 6 and 7 show longitudinal sections parallel to the common plane of the axes of the shafts 10, 11. FIG. 5 shows a section slightly upstream of such a plane while FIG. 6 is a section approximately in that plane (corresponding to the sections shown in FIGS. 1 and 2) and FIG. 7 is a section slightly downstream of such plane. Because of the larger outer diameter of the heating disk 30 compared to the rollers 20, 21, the knife 37 performs a slicing cut of the films 24 enhancing the severing thereof. The frustoconical surfaces 38, 39 cause a certain accumulation of the welded seam 60, resulting in superior seal quality. The foil 24 is held in the immediate vicinity on either side of the location where the welded seam is to be provided and severed, thus making possible an accurate severing cut. By means of an intensive cooling of the rollers 20–23, particularly the rollers 21 and 23, the apparatus may operate with relatively high rpm's allowing a high output rate. By integrating the heating disk into the feed rollers 18, 19 a compact structure is obtained. By virtue of the relatively narrow rollers 21, 23 the welded seam 60 may be provided very close to the hose 25. In this manner, the completed packages have only a very narrow fin of projecting packing material.

It will be understood that the above description of the present invention is susceptible to various modifications, changes and adaptations, and the same are intended to be comprehended within the meaning and range of equivalents of the appended claims.

What is claimed is:

1. An apparatus for longitudinally welding and severing superposed thermoplastic films forming a packaging hose, comprising
   (a) a first feed roller having an outer peripheral diameter;
   (b) a second feed roller; said first and second feed rollers having mutually contacting peripheries for advancing the films passing therebetween;
   (c) drive means for rotating at least one of said first and second feed rollers;
   (d) a circular heating disk mounted in said first feed roller coaxially therewith and having an outer diameter greater than said peripheral diameter of said first feed roller; and
   (e) a circumferential groove provided in said second feed roller and being in alignment with said heating disk; peripheral portions of said heating disk projecting into said circumferential groove.

2. The apparatus as defined in claim 1, wherein said first feed roller comprises two axially adjacent, coaxial individual rollers and further wherein said heating disk is coaxially disposed between said individual rollers.

3. The apparatus as defined in claim 2, wherein said heating disk is annular; further comprising clamping means for attaching said heating disk to one of said individual rollers.

4. The apparatus as defined in claim 2, wherein said individual rollers each have opposite radial faces and said heating disk has a peripheral cutting edge; further wherein axial distances of said cutting edge from the radial faces oriented toward said heating disk is significantly greater than twice an expected thickness of said film.

5. The apparatus as defined in claim 2, wherein said heating disk has a peripheral cutting edge and further wherein said heating disk comprises a frustoconical circumferential surface terminating at said cutting edge and oriented toward said mutually contacting peripheries; said frustoconical circumferential surface having a cone angle of approximately 120°.

6. The apparatus as defined in claim 5, wherein said frustoconical circumferential surface is a first frustoconical circumferential surface; said heating disk further comprising a second frustoconical circumferential surface having a cone angle of approximately 158° and adjoining radially inwardly said first frustoconical circumferential surface; further wherein a circumferential line where said first and second frustoconical circumferential surfaces join has a diameter greater than said outer peripheral diameter of said first feed roller.

7. The apparatus as defined in claim 6, wherein said heating disk is, in a region of said first and second frustoconical surfaces, symmetrical to a radial plane containing said cutting edge.

8. The apparatus as defined in claim 1, further comprising means for heat-insulating said heating disk from said first feed roller.

9. The apparatus as defined in claim 1, further comprising cooling channels provided in said first feed roller and means for supplying a coolant to said cooling channels.

10. The apparatus as defined in claim 9, further comprising
    (a) a drive shaft carrying said first feed roller;
    (b) bore holes provided in said drive shaft; said bore holes communicating with said cooling channels; and
    (c) a bearing-and-coupling assembly for supporting said drive shaft for rotation therein and for hydraulically coupling said bore holes with said means for supplying a coolant.

11. The apparatus as defined in claim 1, further comprising first and second drive shafts carrying said first and second feed rollers, respectively; said drive means comprising means for rotating said first and second feed rollers in unison and in opposite directions.

* * * * *